United States Patent [19]

Yamamoto

[11] 4,188,754
[45] Feb. 19, 1980

[54] PORTABLE CUTTER

[76] Inventor: Koichi Yamamoto, 75, Kasuga, Taishi-cho, Minamikawachi-gun, Osaka-fu, Japan

[21] Appl. No.: 903,675

[22] Filed: May 8, 1978

[30] Foreign Application Priority Data

May 23, 1977 [JP] Japan .................................. 52-61497

[51] Int. Cl.² .......................... B24B 27/06; B25B 5/06
[52] U.S. Cl. .................................... 51/37; 51/217 R; 83/455; 83/462; 83/485; 269/87.1
[58] Field of Search ............... 51/34 C, 37, 217 R; 125/12, 13 R, 35; 269/87.1; 83/454, 455, 462, 463, 464, 485

[56] References Cited

U.S. PATENT DOCUMENTS

| | | | |
|---|---|---|---|
| 677,205 | 6/1901 | Hackett | 83/454 |
| 1,191,905 | 7/1916 | Maynard | 51/217 L X |
| 1,306,261 | 6/1919 | Klein | 83/455 |
| 2,109,827 | 3/1938 | Moffett | 51/34 C |
| 2,736,311 | 2/1956 | Coates | 125/13 R |

FOREIGN PATENT DOCUMENTS

| | | | |
|---|---|---|---|
| 612746 | 8/1926 | France | 83/462 |
| 14176 | 3/1897 | Switzerland | 83/464 |

*Primary Examiner*—Gary L. Smith
*Attorney, Agent, or Firm*—Wenderoth, Lind & Ponack

[57] ABSTRACT

A portable cutter used to cut structural materials at a construction site. The material to be cut is clamped between a fixing rod and a bed frame and is cut by means of a grinder mounted so as to be slidable longitudinally along a machine frame. The fixing rod and the machine frame are adapted to be fastened to the bed frame.

4 Claims, 4 Drawing Figures

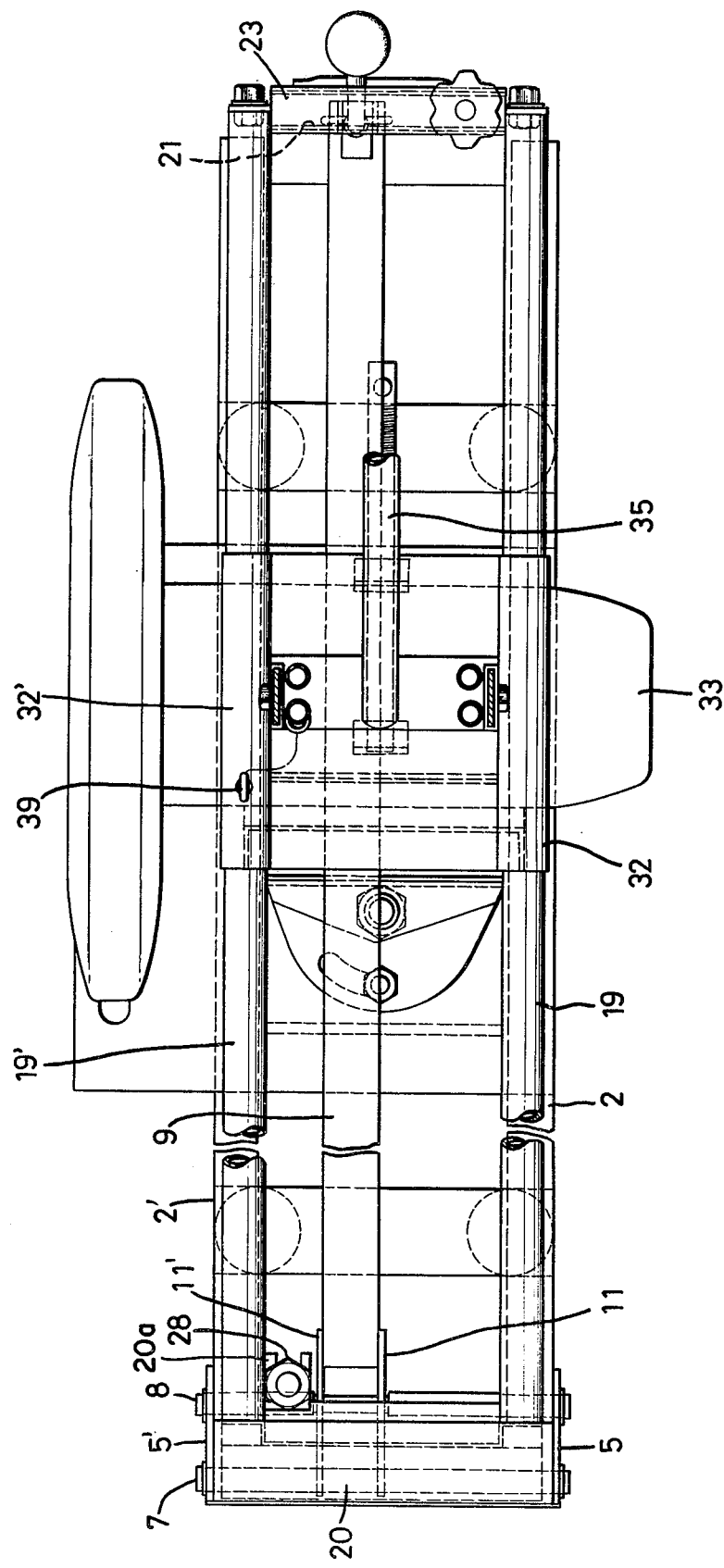

PORTABLE CUTTER

The present invention relates to a portable cutter used to cut various kinds of structural materials.

Structural materials used for construction or civil engineering are often cut into desired sizes at the construction site. Even if they have been cut beforehand, the necessity of re-cutting at the site often occurs because of inaccurate size, a design change or other reasons. In such cases, metal materials are usually cut by gas torch cutting. However, this cutting method has disadvantages such as inaccurate cutting and rough cut edges which require finishing.

An object of this invention is to provide a portable cutter which permits accurate cutting of structural materials of various types and sizes.

Other features and advantages of this invention will become apparent from the following description taken with reference to the accompanying drawings in which:

FIG. 3 is a top plan view thereof; and

Figure 1:
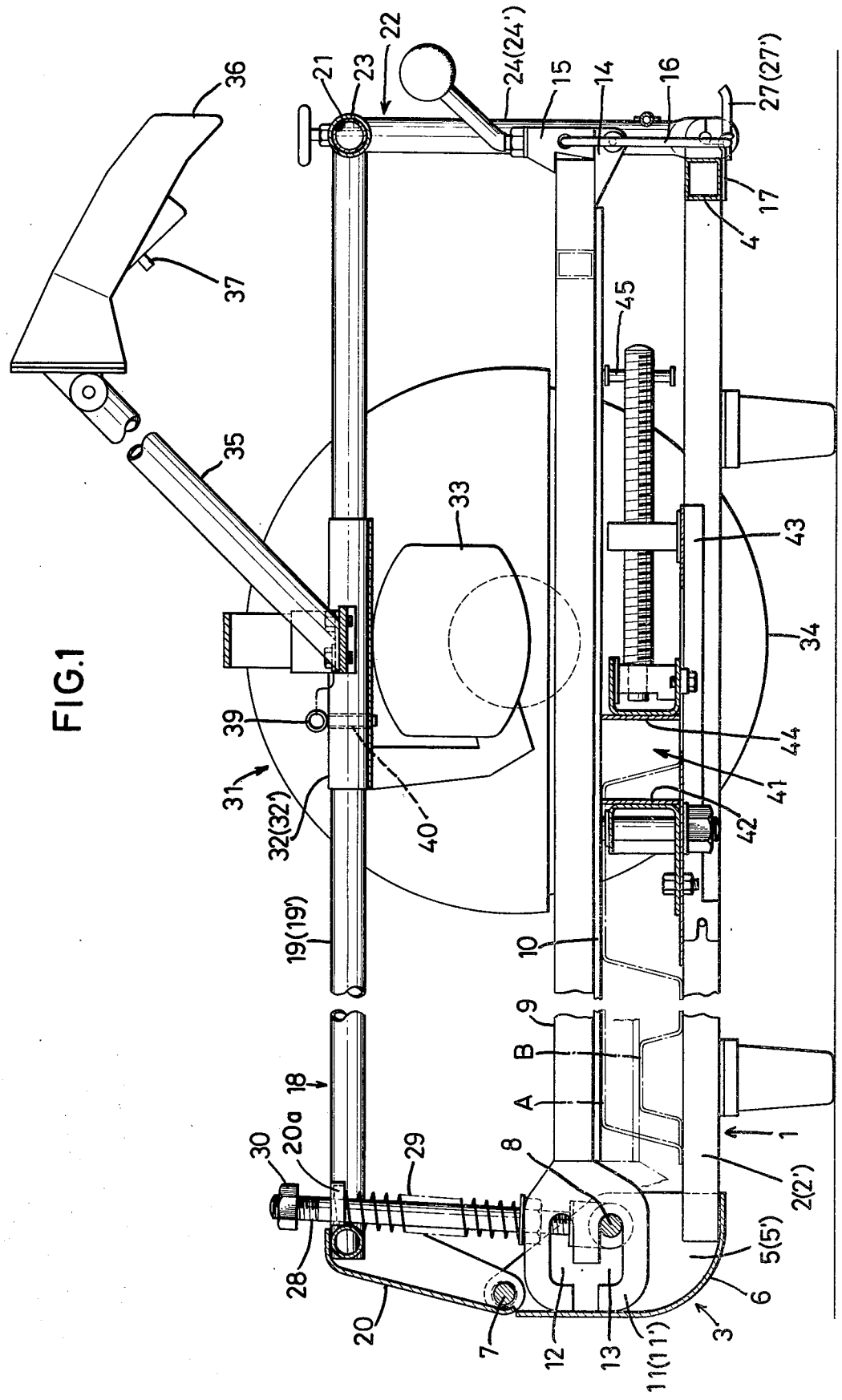
FIG. 1 is a front elevation view of an embodiment of this invention.
Figure 2:
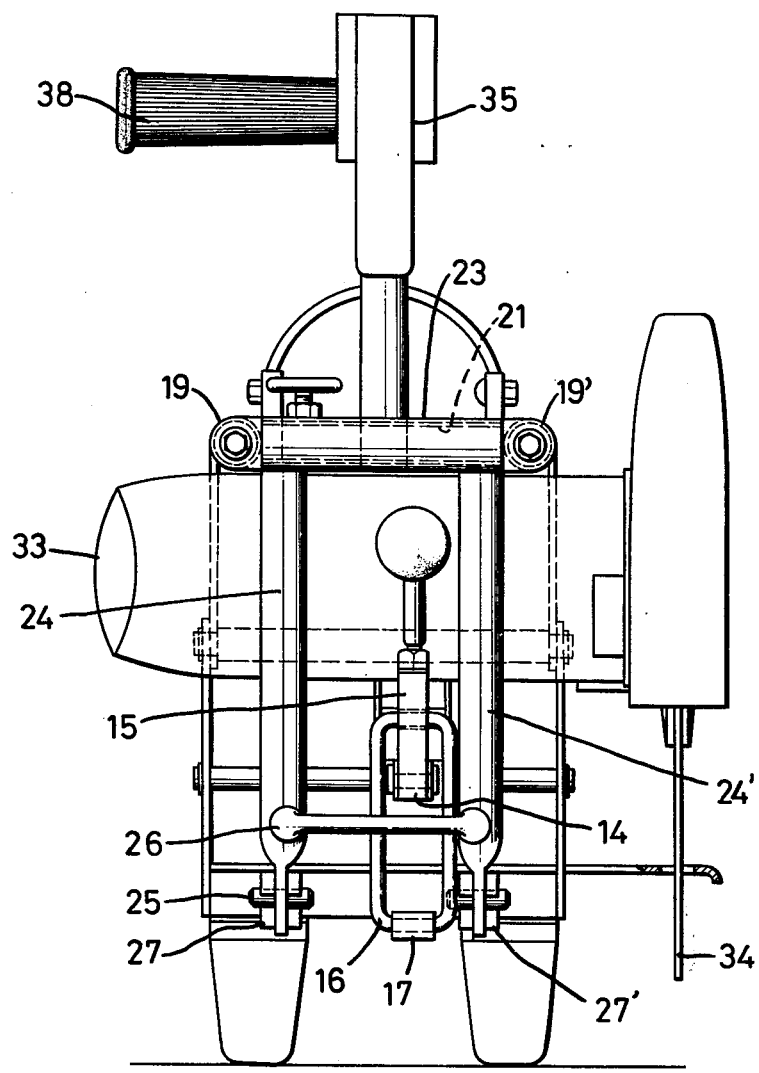
FIG. 2 is an end elevation thereof.

Referring to the drawings, a bed frame 1 is constituted by two parallel square cross-section pipes 2 and 2' coupled together by a support frame 3 at the front end and by a square cross-section pipe 4 at the rear end. The support frame 3 comprises two side plates 5 and 5' secured to the sides of the square pipes 2 and 2' and a front plate 6 connecting the sideplates together. A support shaft 7 and a mounting shaft 8 are carried by the side plates 5 and 5' at the front top and rear center thereof, respectively.

A fixing rod 9 constituted by, a square cross-section pipe has attached to the bottom thereof a resilient member 10 made of a material such as natural or synthetic rubber. To the front end of the fixing rod 9 are secured a pair of mounting plates 11 and 11' which have two sockets 12 and 13 therein. The fixing rod 9 is provided at its rear end with a lower retainer portion 14 adapted to receive, and be coupled with, an upper retainer portion 15 on which a ring 16 is pivotally mounted. The ring 16 is adapted to be engaged with a hook 17 provided at rear end of the bed frame 1.

Figure 4:
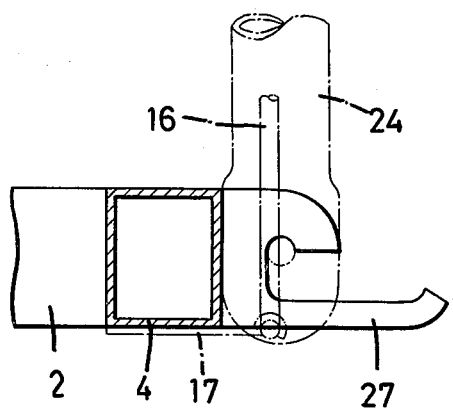
FIG. 4 is an enlarged sectional view of the hook for the fixing frame.

A machine frame 18 is provided which comprises two parallel guide tubes 19 and 19' coupled together by a front frame member 20 at the front end and by a tubular rear shaft 21 at the rear end to form a rectangular frame. The front frame member 20 is rotatably mounted on the support shaft 7. The machine frame 18 is provided at its rear end with a fixing frame 22 which has a tubular member 23 rotatably mounted on the rear shaft 21, two vertical tubes 24 and 24' each carrying a horizontal latch 25 at the flat lower end thereof, and a coupling member 26 to form a rectangular frame. The horizontal latches 25 are adapted to be engaged in respective hooks 27 and 27' provided on the bed frame 1 at the rear end thereof, as illustrated in FIG. 4.

A coupling rod 28 is rotatably mounted on the mounting shaft 8 and is adapted to be secured to a slotted bracket 20a on the front frame 20. A spring 29 is mounted on the coupling rod 28 and has one end secured thereto and has the other end engaging bracket 20a so as to urge the machine frame 18 upwardly around support shaft 7 when the machine frame 18 is in the position shown FIG. 1. The coupling rod 28 is provided with a stop nut 30 at the top to limit the upward movement of the machine frame 18. When the fixing frame 22 is not engaged in the hooks 27 and 27', the spring 29 pushes up the machine frame 18 by pressing on bracket 20a. When the fixing frame is engaged with the hooks, the spring acts to secure engagement of the fixing frame in the hooks.

A cutting means generally designated by 31 comprises two sliding tubes 32 and 32' slidably mounted on the guide tubes 19 and 19' and coupled together, a driving means 33, e.g. a motor, carried by one sliding tube 32, a grinder 34 coupled with and driven by the driving means, and a control lever 35 extending upwardly from a rod coupling two sliding tubes and carrying a main handle 36 with a power switch 37 and an auxiliary handle 38. A fixing pin 39 is adapted to fit in holes 40 in the sliding tube 32' and in the guide tube 19'. Except during operation, the fixing pin is set in the holes 40 to prevent the cutting device from freely sliding to avoid an accident.

Although in the preferred embodiment the cutting device is slid manually by the handles, it can be motor-driven by means of a rack-and-pinion arrangement.

A clamping means generally designated by 41 can be provided for clamping pipes, bar steel, shaped steel or the like. It comprises a fixed abutment 42 secured to a bed plate 43 and a movable abutment 44 opposed thereto and slidable by rotating a handle 45.

In operation, the material to be cut, for example, a deck plate A, is first clamped in position as illustrated in FIG. 1. To clamp the material, the fixing frame 22 is first disengaged from the hooks 27 and 27' to let the spring 29 push up the machine frame 18. The fixing rod 9 is then removed and the plate to be cut is placed in such a position that it will be cut along a desired line by the grinder 34. The mounting plates 11 and 11' at front end of the fixing rod 9 are mounted on the mounting shaft 8 with the latter in the lower sockets 13. The fixing rod 9 is then put on the material to be cut with the resilient member 10 on the upper surface of the material. The upper retainer half 15 is snapped into engagement with the lower retainer half 14 with the ring 16 engaging the hook 17. The material to be cut is thus firmly and resiliently clamped between the fixing rod 9 and the bed frame 1.

Then, the machine frame 18 is pulled down against the bias of spring 29 and the rear end of the fixing frame 22 is engaged in the hooks 27 and 27'. The resilient force of the spring 29 acting upwardly ensures secure engagement of the machine frame with the bed frame. This completes the setting of the material to be cut.

To cut the material, the fixing pin 39 is pulled out of the hole 40 to free the cutting means 31 for sliding along the slide tubes and the power switch 37 is turned on to start the grinder 34. The cutting means 31 is then pushed forward by the handles 43 and 44 to cut the deck plate A with the rotating grinder 34. After it has been cut, the cutting means is brought back to its original position and the fixing pin 39 is reset to fix the sliding tubes on the guide tubes and thus fix the cutting device. The material thus cut to a desired size is removed from the machine.

When the cutter is used to cut a keystone plate B of smaller height than a deck plate A, the mounting plates 11 and 11' at the front of the fixing rod 9 are mounted by placing the mounting shaft 8 in the upper socket 12 instead of the lower socket 13. Thus, because the mounting plates have two sockets whey make possible the cutting of two kinds of structural materials of different heights. Also, a vertical slit may be provided in each side plate 5 (5') for the mounting shaft 8 to make the height adjustable according to the height of material.

When pipes, shaped steel, bar steel or the like is to be cut, it may be clamped between the fixed plate 42 and the movable plate 44.

Although relatively wide materials can be cut by sliding the grinder forward in a horizontal plane, as described above, with the fixing frame 22 engaged in the hooks 27 and 27', narrower materials or pipes, shaped steel, bar steel or the like may be cut by pulling down the machine frame 18 against the bias of the spring 29 to move the grinder vertically. In this case, the fixing frame 22 is not engaged in the hooks, but is kept free, of course.

It will be understood from the foregoing that the portable cutter according to this invention can be carried to a construction site because of its light weight and that it produces a smooth cut surface since a grinder is used for cutting.

What is claimed is:

1. A portable cutter for cutting structural materials comprising:
   a bed frame for supporting the material to be cut thereon;
   a laterally extending mounting shaft mounted on said bed frame at the front end thereof;
   a fixing rod extending longitudinally along said bed frame and spaced thereabove for clamping material to be cut against said bed frame;
   a mounting plate secured to said fixing rod at the front end thereof and having a plurality of sockets therein at different distances above said bed frame and pivotally engageable with said mounting shaft;
   a machine frame rotatably mounted on said bed frame above said fixing rod;
   cutting means horizontally slidably mounted on said machine frame;
   means on the rear end of said fixing rod for fastening the fixing rod to the bed frame with said fixing rod substantially parallel to said bed frame for clamping the material to be cut between said fixing rod and said bed frame; and
   means on said machine frame for fastening the machine frame to said bed frame with said machine frame parallel to said bed frame.

2. A portable cutter as claimed in claim 1 wherein said cutting means comprises a grinder and driver means for driving the grinder.

3. A portable cutter as claimed in claim 1 further comprising a spring rotatably mounted on said mounting shaft and engaging said machine frame for upwardly biasing said machine frame.

4. A portable cutter as claimed in claim 1 further comprising a fixed abutment along said base frame beneath said fixing rod, and a movable abutment opposed to said fixed abutment and movable along said base frame.

* * * * *